United States Patent
Hashimoto et al.

(10) Patent No.: US 12,237,116 B2
(45) Date of Patent: Feb. 25, 2025

(54) CAPACITOR AND METHOD FOR MANUFACTURING SAME

(71) Applicant: NIPPON CHEMI-CON CORPORATION, Tokyo (JP)

(72) Inventors: Youhei Hashimoto, Tokyo (JP); Kouichi Nakata, Tokyo (JP); Ryuuta Inoue, Tokyo (JP); Keisuke Matsuhira, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 194 days.

(21) Appl. No.: 17/913,279

(22) PCT Filed: Mar. 25, 2021

(86) PCT No.: PCT/JP2021/012457
§ 371 (c)(1),
(2) Date: Sep. 21, 2022

(87) PCT Pub. No.: WO2021/193794
PCT Pub. Date: Sep. 30, 2021

(65) Prior Publication Data
US 2023/0142563 A1    May 11, 2023

(30) Foreign Application Priority Data
Mar. 26, 2020   (JP) .................. 2020-055817

(51) Int. Cl.
*H01G 2/06*   (2006.01)
*H01G 9/10*   (2006.01)
(Continued)

(52) U.S. Cl.
CPC .............. *H01G 9/10* (2013.01); *H01G 2/06* (2013.01); *H01G 9/00* (2013.01); *H01G 9/048* (2013.01); *H01G 9/145* (2013.01)

(58) Field of Classification Search
CPC .. H01G 9/10; H01G 2/06; H01G 9/00; H01G 9/048; H01G 9/145; H01G 9/008; H01G 2/106; H01G 2/103; H01G 4/224
See application file for complete search history.

(56) References Cited

U.S. PATENT DOCUMENTS

| | | | |
|---|---|---|---|
| 3,852,647 A * | 12/1974 | Ishii | H01G 9/10 29/25.03 |
| 4,326,642 A * | 4/1982 | Wolf | H01M 50/169 361/519 |
| 2020/0251288 A1* | 8/2020 | Koyanagi | H01G 9/008 |

FOREIGN PATENT DOCUMENTS

| | | |
|---|---|---|
| JP | 55-149941 U | 10/1980 |
| JP | 60-245121 A | 12/1985 |

(Continued)

OTHER PUBLICATIONS

Notification Concerning Transmittal of International Preliminary Report on Patentability (Form PCT/IB/326) Issued in counterpart International Application No. PCT/JP2021/012457 mailed Oct. 6, 2022, with Forms PCT/IB/373, PCT/IB/338 and PCT/ISA/237. (14 pages).

(Continued)

*Primary Examiner* — Nathan Milakovich
*Assistant Examiner* — Daniel M Dubuisson
(74) *Attorney, Agent, or Firm* — WHDA, LLP (57) ABSTRACT

A capacitor (2) includes a capacitor main body (4) and a base (6). The capacitor main body includes an opening sealing member (14) attached to an opening of an outer package case (10), and a terminal lead (16-1, 16-2) led out from a first insertion through hole portion (17-1, 17-2) of the opening sealing member. The base is disposed on the side of the opening sealing member of the capacitor main body, and has a second insertion through hole portion (18-1, 18-2). For example, the base includes a first protruding portion (20)

(Continued)

surrounding the second insertion through hole portion, so that the second insertion through hole portion of the base forms an insertion through hole. The opening distance on the side of the substrate mounting face of the insertion through hole is larger than the opening distance on the side of the capacitor main body of the insertion through hole.

8 Claims, 7 Drawing Sheets

(51) Int. Cl.
  *H01G 9/00* (2006.01)
  *H01G 9/048* (2006.01)
  *H01G 9/145* (2006.01)

(56) References Cited

FOREIGN PATENT DOCUMENTS

| | | | |
|---|---|---|---|
| JP | 3-106011 | A | 5/1991 |
| JP | 2008-244033 | A | 10/2008 |
| JP | 2012244081 | A * | 12/2012 |
| JP | 2019186245 | A * | 10/2019 |
| WO | 2018/020993 | A1 | 2/2018 |
| WO | 2018/079358 | A1 | 5/2018 |
| WO | WO-2019190739 | A1 * | 10/2019 ............... H01G 9/06 |

OTHER PUBLICATIONS

International Search Report dated Jun. 15, 2021, issued in counterpart International Application No. PCT/JP2021/012457, w/English translation (7 pages).
Written Opinion in Japanese dated Jun. 15, 2021, issued in counterpart International Application No. PCT/JP2021/012457 (5 pages).
Office Action dated Jan. 30, 2024 issued in counterpar JP application No. 2020-055817, with English translation. (10 pages).
Office Action dated Jul. 26, 2024, issued in counterpart Chinese Patent Application No. 202180022732.9, with partial English translation (16 pages).
Office Action dated Aug. 5, 2024, issued in counterpart Taiwan Patent Application No. 110110840, with partial English translation (11 pages).

* cited by examiner

CAPACITOR AND METHOD FOR MANUFACTURING SAME

TECHNICAL FIELD

The present disclosure relates to a capacitor that is mountable on a wiring board such as a circuit substrate, and a method for manufacturing the capacitor.

BACKGROUND ART

To mount a capacitor on a wiring board such as a circuit substrate, the capacitor includes, for example, a base. Terminal leads of the capacitor are drawn out on the outer side face (a substrate mounting face) of the base and are folded to be soldered to, for example, the wiring board. The capacitor used for the mounting is called "surface-mount capacitor". The general versatility of the surface-mount capacitor is high and the surface-mount capacitor is used in, for example, an automobile.

When the capacitor is disposed in the exterior such as the inside of an automobile, the environmental temperature around the disposition point of the capacitor is increased. The capacitor therefore needs to endure the high-temperature environment. For example, a resin layer is formed between an opening sealing body and the base of the capacitor, and the sealing property of the capacitor is thereby enhanced (e.g., Patent Literature 1). According to this configuration, the heat resistance of the capacitor can be improved. In this capacitor having the base disposed therein, insertion through holes are formed in the base and the terminal leads of the capacitor are disposed on the outer side of the base, that is, on the side of the substrate mounting face through the insertion through holes.

CITATION LIST

Patent Literature

Patent Literature 1: Japanese Laid-Open Patent Publication No. 60-245121

SUMMARY OF INVENTION

Technical Problem

The resin layer is formed by, for example, heating and hardening a thermo-setting resin. The heated thermo-setting resin has a property that the viscosity thereof is lowered immediately before the hardening. The thermo-setting resin that is disposed between the terminal leads and the base, and that has the low viscosity consequently receives a force in the direction toward the outer side of the base caused by the capillary action. In the case where the resin layer is formed between the opening sealing body and the base by injecting a liquid-like resin, the liquid-like resin reaching a gap between the terminal leads and the base consequently receive a force in the direction toward the outer side of the base caused by the capillary action. When the resin receiving the force moves toward the outer side of the base, the resin adheres to the periphery of the terminal leads disposed on the outer side of the base, and this may obstruct the soldering of the terminal leads.

Patent Literature 1 does not disclose and suggest this problem and the configuration disclosed in Patent Literature 1 cannot solve this problem.

A first object of the technique of the present disclosure is to suppress the force acting on the resin between the terminal leads and the base caused by the capillary action, for example.

A second object of the technique of the present disclosure is to suppress the move of the resin between the terminal leads and the base, to the outer side of the base caused by the capillary action, for example.

Solution to Problem

According to a first aspect of the present disclosure, a capacitor includes a capacitor main body, a base, and a resin layer. The capacitor main body includes an outer package case, an opening sealing member that has a first insertion through hole portion and that is attached to an opening of the outer package case, and a terminal lead led out from the first insertion through hole portion. The base is disposed on a side of the opening sealing member of the capacitor main body and has a second insertion through hole portion through which the terminal lead is inserted to expose the terminal lead on a side of a substrate mounting face. The resin layer is disposed between the base and the opening sealing member. The base includes a first protruding portion surrounding the second insertion through hole portion, so that the second insertion through hole portion of the base forms an insertion through hole; or the opening sealing member includes a second protruding portion that surrounds the first insertion through hole portion and that contacts the base, so that the second insertion through hole portion of the base and the first insertion through hole portion surrounded by the second protruding portion form an insertion through hole. The resin layer is adjacent to the first protruding portion or the second protruding portion. An opening distance on the side of the substrate mounting face of the insertion through hole is larger than an opening distance on a side of the capacitor main body of the insertion through hole.

In the capacitor, the insertion through hole may include a step portion or a slope face on an inner side face of the insertion through hole.

In the capacitor, a difference between the opening distances on a side more outer than the terminal lead may be smaller than a difference between the opening distances on a side closer to a center than the terminal lead.

According to a second aspect of the present disclosure, a method for manufacturing a capacitor includes: fabricating a capacitor main body including an outer package case, an opening sealing member that has a first insertion through hole portion and that is attached to an opening of the outer package case, and a terminal lead led out from the first insertion through hole portion; fabricating a base having a second insertion through hole portion; and disposing the base on a side of the opening sealing member of the capacitor main body and inserting the terminal lead through the second insertion through hole portion to expose the terminal lead on a side of a substrate mounting face. At the fabricating of the base, a first protruding portion surrounding the second insertion through hole portion is formed in the base, so that the second insertion through hole portion of the base forms an insertion through hole; or at the fabricating of the capacitor main body, a second protruding portion that surrounds the first insertion through hole portion and that has a height to contact the base is formed in the opening sealing member, so that the second insertion through hole portion of the base and the first insertion through hole portion surrounded by the second protruding portion form an insertion through hole. An opening distance on the side of the substrate mounting face of the insertion through hole is larger than an opening distance on a side of the capacitor main body of the insertion through hole.

The method for manufacturing a capacitor may further include forming a resin layer disposed between the base and the opening sealing member, the resin layer being adjacent to the first protruding portion or the second protruding portion.

Advantageous Effects of Invention

According to the technique of the present disclosure, any one effect of the following can be achieved.

(1) The opening distance on the side of the substrate mounting face of the insertion through hole is larger than the opening distance on the side of the capacitor main body. In a portion on the side of the substrate mounting face of the insertion through hole, an action of elevating the liquid level caused by the capillary action (hereinafter, referred to as "action caused by the capillary action") can therefore be suppressed. The force acting on the liquid-like or low-viscosity resin disposed between the terminal lead and the base can be suppressed.

(2) The move of the liquid-like or low-viscosity resin to the outer side (the substrate mounting face) of the base caused by the capillary action can be suppressed.

(3) Obstruction to the soldering of the terminal lead by the resin moved to the outer side (the substrate mounting face) of the base due to the capillary action can be suppressed.

(4) Reduction of the amount of the resin filling the capacitor due to the move of the resin caused by the capillary action can be suppressed.

DESCRIPTION OF EMBODIMENTS

Embodiments and the like will be described below with reference to the drawings.

First Embodiment

Figure 1:
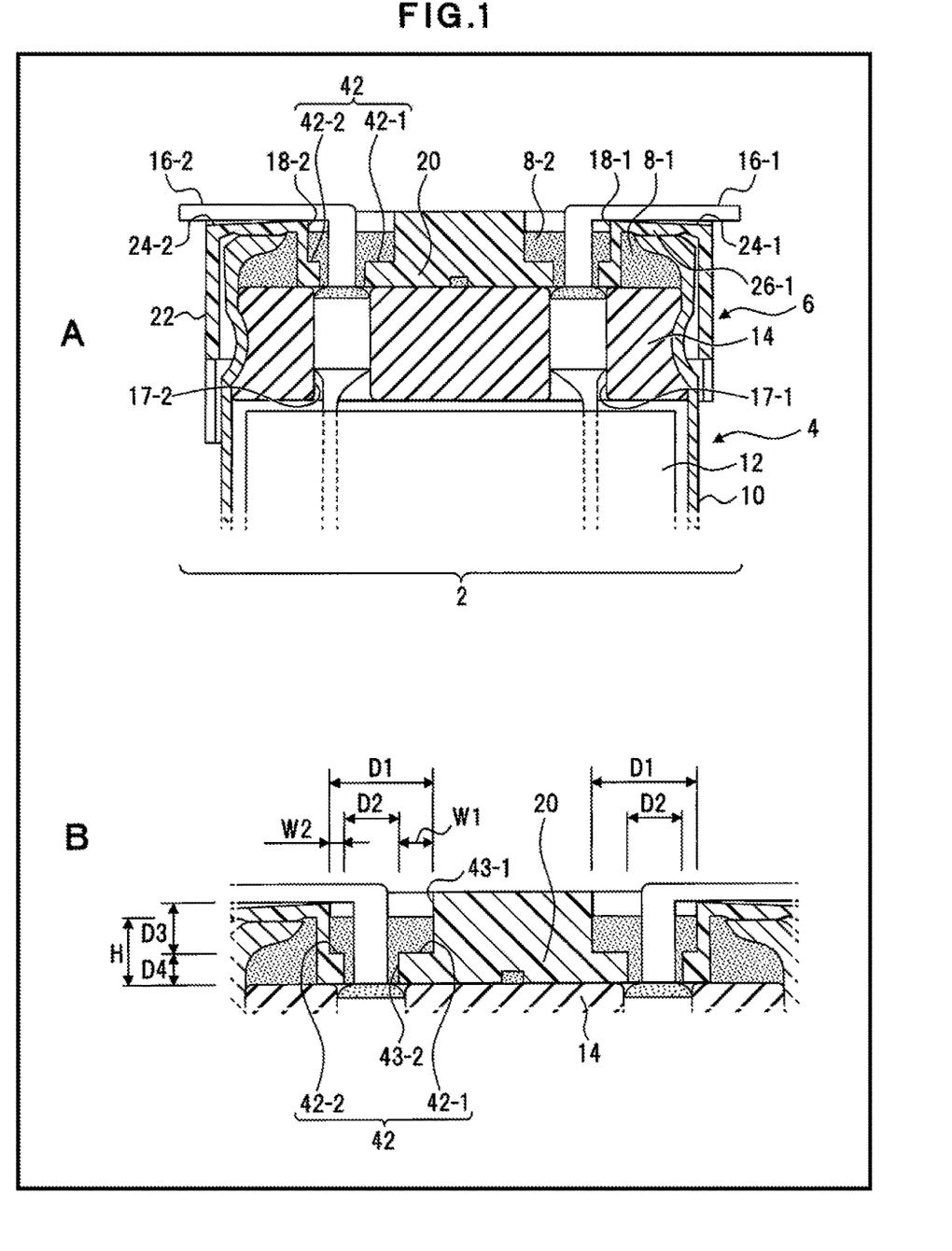
FIG. 1 shows cross-sectional diagrams depicting an example of a capacitor according to a first embodiment.
Figure 2:
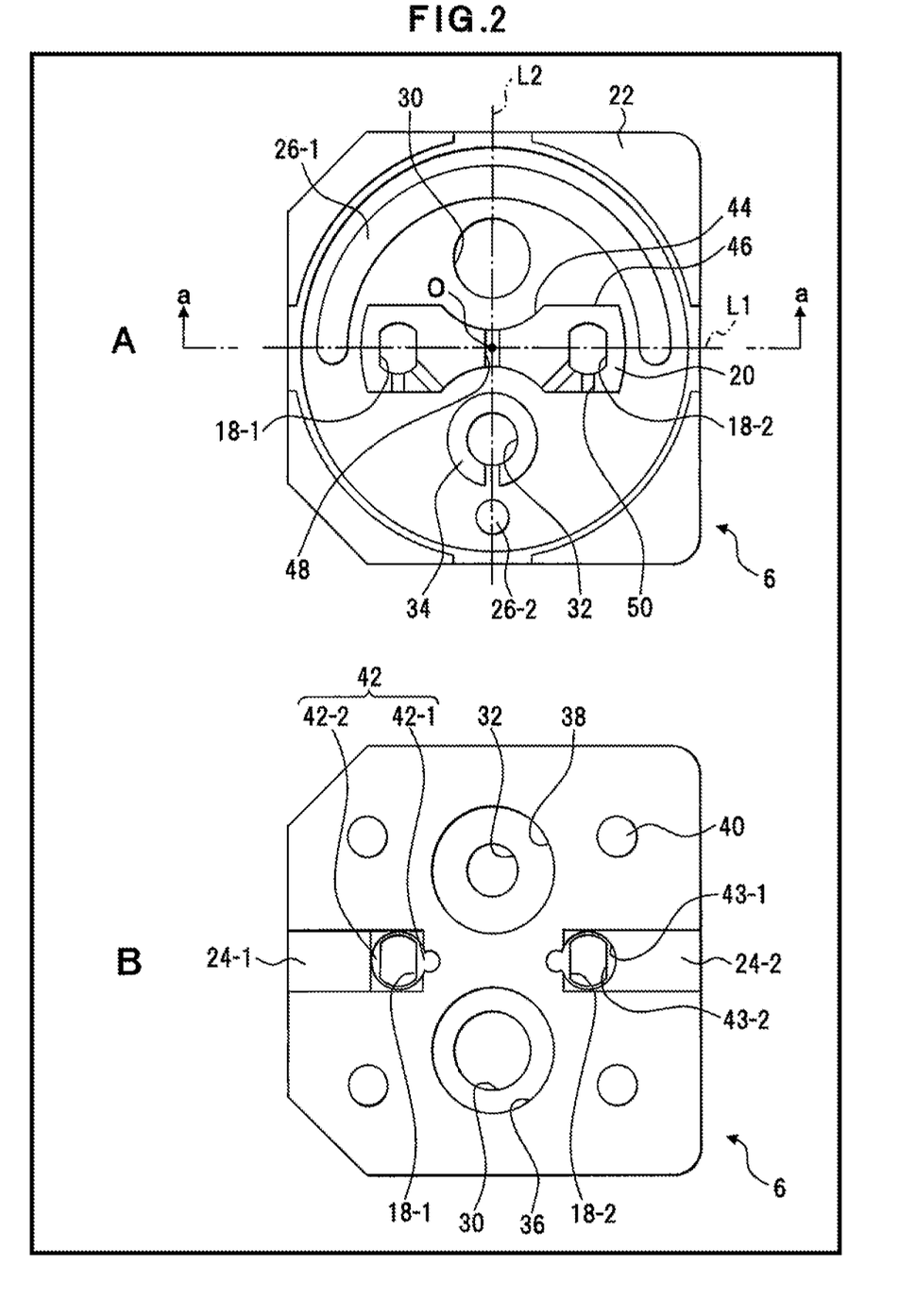
FIG. 2 shows diagrams of a base of the capacitor.
Figure 3:
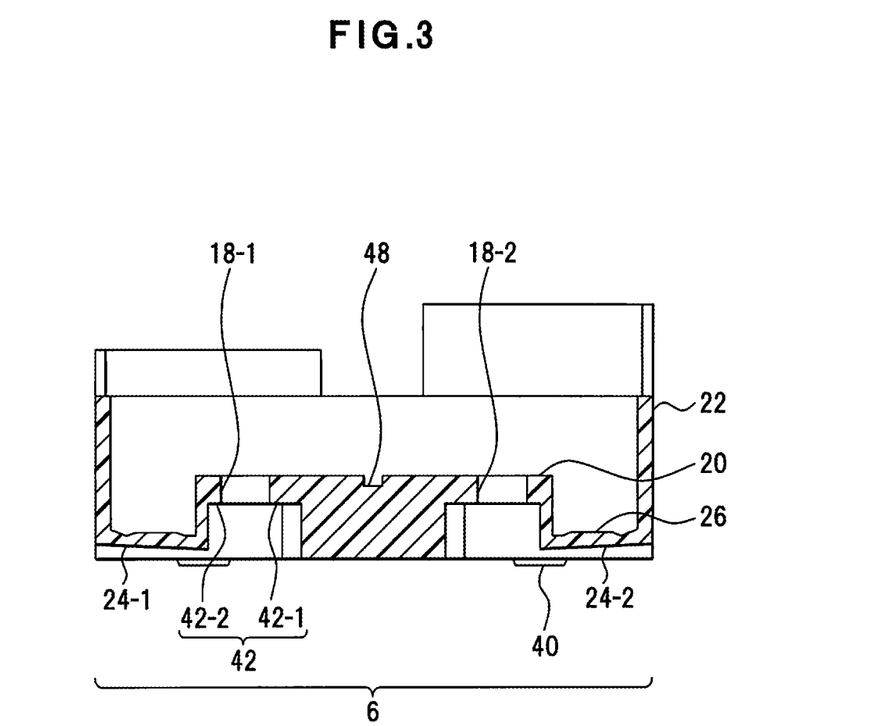
FIG. 3 is a cross-sectional diagram taken along an a-a line in A of FIG. 2.
Figure 4:
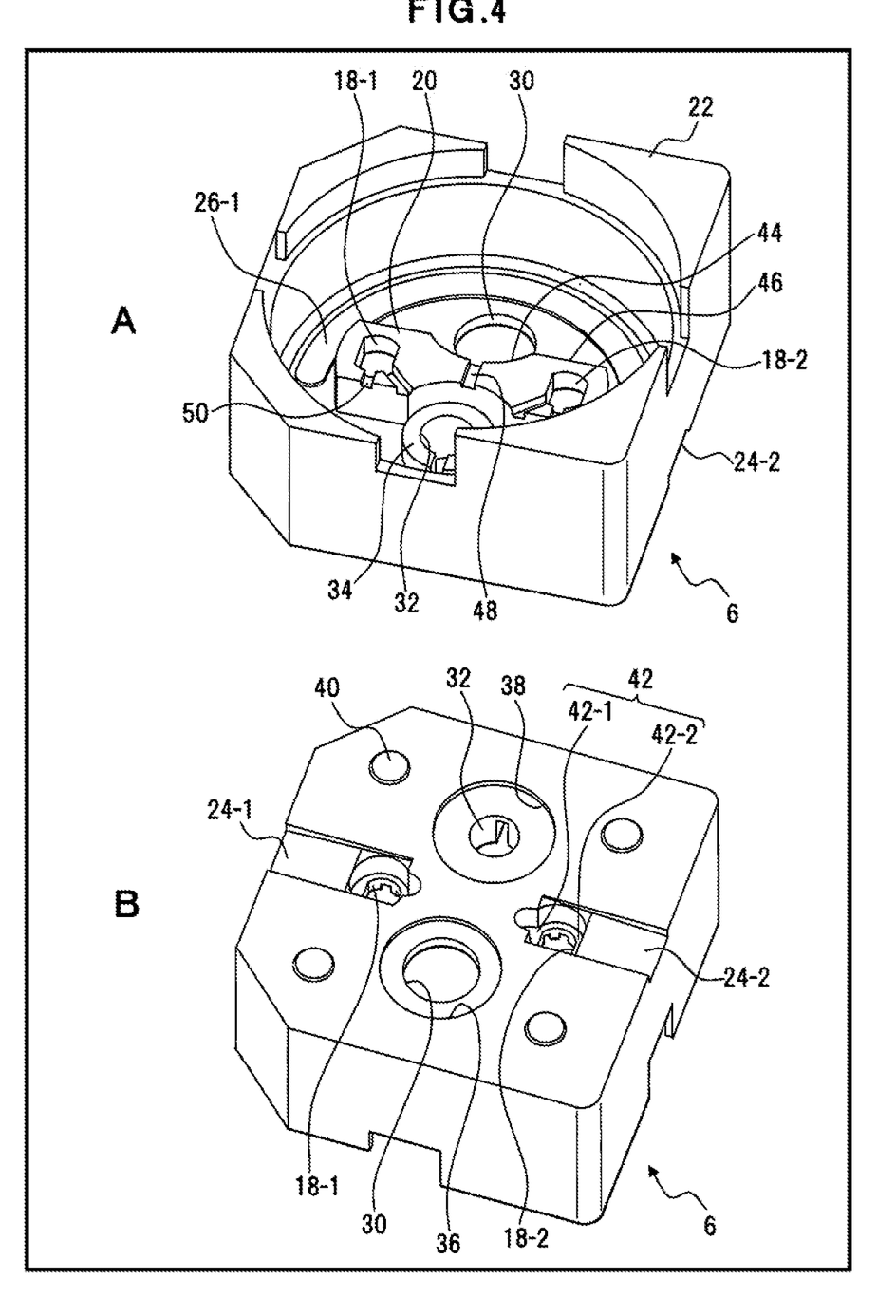
FIG. 4 shows perspective diagrams of the base.

A of FIG. 1 is a cross-sectional diagram depicting an example of a capacitor according to a first embodiment, and B of FIG. 1 is an enlarged partial diagram of A of FIG. 1. A of FIG. 1 does not depict a portion of a capacitor main body. A of FIG. 2 is a planar diagram of a base of the capacitor, and depicts a face portion that is a main body disposing face to be disposed on the capacitor main body and that is on the side of an opening sealing member of the base. B of FIG. 2 is a bottom diagram of the base, and depicts the opposed surface that is opposed to the main body disposing face and that is the face on the outer side of the base (a substrate mounting face). FIG. 3 depicts a cross-section taken along an a-a line in A of FIG. 2. A of FIG. 4 and B of FIG. 4 are perspective diagrams of the base. A virtual line L1, a halfway point O, and a central line L2 are added to the base depicted in A of FIG. 2 to explain the base. The configuration depicted in FIG. 1 to FIG. 4 is an example and the technique of the present disclosure is not limited to the configuration.

The capacitor 2 is an example of an electronic part and is, for example, an electrolytic capacitor or an electric double-layer capacitor. The capacitor 2 includes a capacitor main body 4, a base 6, and resin layers 8-1 and 8-2. The base 6 is disposed on the capacitor main body 4, the resin layer 8-1 is disposed in a gap between the base 6 and the capacitor main body 4, and the resin layer 8-2 is disposed in the inside of an insertion through hole formed in the base 6. The capacitor 2 is mountable on a wiring board such as a circuit substrate.

The capacitor main body 4 can also be used alone as a capacitor. The capacitor main body 4 includes an outer package case 10, a capacitor element 12, and an opening sealing member 14. The capacitor element 12 is sealed in the outer package case 10, and the opening sealing member 14 is attached to an opening of the outer package case 10.

The outer package case 10 is, for example, a bottomed cylinder-like aluminum case. A tip portion of the opening of the outer package case 10 is folded nearly at a right angle, and an end portion on the side opposite to the bottom of the outer package case 10 (hereinafter, referred to as "opening end") therefore has a flat face.

The capacitor element 12 is a wound element in which an anode foil, a cathode foil, and a separator interposed between the anode foil and the cathode foil are wound, with terminal leads 16-1 and 16-2 led out from the same element plane. The capacitor element 12 is impregnated with an electrolytic solution.

The terminal leads 16-1 and 16-2 are each formed by, for example, a metal that is excellent in the electric conductivity. The terminal lead 16-1 is the terminal on the anode side, and includes a lead portion that is drawn out from the anode foil of the capacitor element 12 and a terminal portion that is to be mounted on a wiring board. The lead portion and the terminal portion are connected to each other to be integrated with each other by welding or the like. The terminal lead 16-2 is the terminal on the cathode side, and includes a lead portion that is drawn out from the cathode foil of the capacitor element 12 and a terminal portion that is to be mounted on the wiring board. Similar to the terminal lead 16-1, the lead portion and the terminal portion are connected to each other to be integrated with each other by welding or the like. The lead portion has, for example, a columnar shape, and the terminal portion is, for example, a portion formed by flattening the portion thereof on the side of the face to be mounted on the wiring board and shaping the cross-section thereof into a rectangular shape.

The opening sealing member 14 is formed by, for example, an insulating rubber. The opening sealing member 14 includes first insertion through hole portions 17-1 and 17-2 (hereinafter, referred to as "insertion through hole portions 17-1 and 17-2") at positions corresponding to those of the terminal leads 16-1 and 16-2. The terminal leads 16-1 and 16-2 of the capacitor element 12 penetrate the insertion through hole portions 17-1 and 17-2 of the opening sealing member 14, and are exposed on the outer side of the capacitor main body 4.

The base 6 is disposed on the side of the opening sealing member 14 of the capacitor main body 4. The base 6 is formed by an insulating plate made from an insulating synthetic resin or the like. The insulating synthetic resin has heat resistance enough to withstand heating when mounted on the wiring board, and is, for example, polyester resin such as polybutylene terephthalate (PBT), polybutylene naphthalate (PBN), and polybutylene terephthalate (PET); polyamide resin such as nylon; polyphenylene sulfide (PPS); polyphenylene oxide (PPO); urea resin; liquid crystal polymer (LCP); phenol resin; or epoxy resin. The base 6 includes second insertion through hole portions 18-1 and 18-2 (hereinafter, referred to as "insertion through hole portions 18-1 and 18-2"), a first protruding portion 20 (hereinafter, referred to as "protruding portion 20"), a circumferential wall 22, and guide grooves 24-1 and 24-2. As depicted in A of FIG. 2, the base 6 includes support protruding portions 26-1 and 26-2, a resin injection hole 30, a through hole 32, and a shielding portion 34 and, as depicted in B of FIG. 2, includes step portions 36 and 38, and support portions 40.

The insertion through hole portions 18-1 and 18-2 are holes formed at the positions corresponding to those of the terminal leads 16-1 and 16-2. The pair of terminal leads 16-1 and 16-2 protruding from the capacitor main body 4 penetrate the pair of insertion through hole portions 18-1 and 18-2 formed in the base 6, and are drawn out on the outer side of the outer side face of the base 6, that is, on the side of the substrate mounting face of the base 6. The insertion through hole portions 18-1 and 18-2 alone form insertion through holes to cause the terminal portions of the terminal leads 16-1 and 16-2 to pass therethrough, respectively.

The insertion through hole portions 18-1 and 18-2 include step portions 42, and an opening distance D1 on the side of the substrate mounting face of the insertion through hole is therefore set to be larger than an opening distance D2 on the side of the capacitor main body 4 thereof. The step portions 42 are formed on the inner side faces of the insertion through hole portions 18-1 and 18-2, and each include a step portion 42-1 disposed on the side of the central portion of the capacitor 2 and a step portion 42-2 disposed on the side of the side portion of the capacitor 2. A width W1 of the step portion 42-1 is set to be larger than a width W2 of the step portion 42-2. Because the width W2 is small, the thickness of the protruding portion 20 between the insertion through hole portions 18-1 and 18-2, and the resin layer 8-1 is suppressed, and the area of a face at which the protruding portion 20 faces the opening sealing member 14 is also suppressed. Because the width W1 is large, the action by the capillary action is further suppressed.

The opening distance D2 is maintained to be a small diameter and, on the side of the capacitor main body 4, the gaps between the terminal leads 16-1 and 16-2, and the insertion through hole portions 18-1 and 18-2 are small. The amount of the resin that moves to the outer side of the base 6 (the substrate mounting face) through the insertion through hole portions 18-1 and 18-2 can therefore be suppressed. As to the capacitor 2 after the injection of the resin and before the end of the hardening of the resin, the height may be different between the surface of the resin forming the resin layer 8-1 and the surface of the resin forming the resin layer 8-2. For example, the resin forming the resin layer 8-1 is caused to fill the gap between the base 6 and the capacitor main body 4, and the surface thereof has therefore a height that is almost equal to that of the surface on the side of the capacitor main body 4 of the base 6 (the main body disposing face). On the other hand, the surface of the resin forming the resin layer 8-2 is at a position that is, for example, lower toward the side of the capacitor main body 4 than the surface of the resin forming the resin layer 8-1. In the capacitor 2 whose resin surfaces have the different heights, in the case where the resin forming the resin layer 8-1 and the resin forming the resin layer 8-2 communicate with each other, an action for the two surfaces of the resins to equalize the surfaces acts due to the gravity. A portion of the resin forming the resin layer 8-1 whose surface is high tends to move to the insertion through hole portions 18-1 and 18-2 through a communication portion of the resins. Because the opening distance D2 is however a small diameter, the amount of the resin moving to the insertion through hole portions 18-1 and 18-2 can be suppressed.

The opening distance D1 on the side of the substrate mounting face of the insertion through holes (the insertion through hole portions 18-1 and 18-2) is larger than the opening distance D2 on the side of the capacitor main body 4 due to the formation of the step portion 42, and an accommodation volume for the resin moving to the insertion through holes can therefore be secured on the side of the substrate mounting face of the insertion through holes. Similar to the above, in the capacitor 2 whose resin surfaces have the different heights, due to the equalization of the surfaces caused by the gravity, the resins in the insertion through holes tend to move to the side of the guide grooves 24-1 and 24-2. The move of the resin to the side of the guide grooves 24-1 and 24-2 is however suppressed and the hindrance to the soldering by the resin can be suppressed when the accommodation volume for the resin is large due to the step portion 42.

A distance D3 from the step portion 42 to the substrate mounting face of the base 6 is set to be larger than a distance D4 from the step portion 42 to the surface of the protruding portion 20, that is, the surface on the side of the capacitor main body 4. The rate of the portion having the large opening distance is higher than 50% and the occupation rate of the portion suppressing the action by the capillary action is therefor increased. The distance D4 may be reduced to, for example, the level nearly equal to that of the thickness of the thinnest portion of the protruding portion 20 that separates between the insertion through hole portions 18-1 and 18-2, and the resin layer 8-1 from each other. The distance D4 is a distance that is larger than the thickness necessary for resisting the pressure applied by the resin.

On the side of the capacitor main body 4 rather than the step portion 42, the shape of the cross-section of each of the insertion through hole portions 18-1 and 18-2 (hereinafter, referred to as "main body side cross-section") is, for example, a rectangle having the corners thereof rounded as depicted in A of FIG. 2. On the side of the substrate mounting face rather than the step portion 42, the shape of the cross-section of each of the insertion through hole portions 18-1 and 18-2 (hereinafter, referred to as "mounting face side cross-section") is, for example, a shape formed by two circles overlapping with each other as depicted in B of FIG. 2. These two circles have different sizes and the larger circle includes the main body side cross-section. The smaller circle of the two circles is disposed closer to the side of the center of the capacitor 2 than the larger circle. As the overall configuration, an end portion 43-1 of the mounting face side cross-section is disposed at a position that is distant from an end portion 43-2 of the main body side cross-section toward the outer side. The step portion 42 is disposed in any portion between the end portion 43-1 of the mounting face side cross-section and the end portion 43-2 of the main body side cross-section.

The protruding portion 20 is disposed on the main body disposing face of the base 6. The protruding portion 20 is formed on the periphery of the insertion through hole portions 18-1 and 18-2, and surrounds the insertion through hole portions 18-1 and 18-2. The protruding portion 20 faces the opening sealing member 14 and isolates the resin layer 8-1 adjacent to the protruding portion 20 and the insertion through hole portions 18-1 and 18-2 from each other. The height of the protruding portion 20 is set to be, for example, a height difference H between the outer side face of the opening sealing member 14 and the main body disposing face of the base 6 (B of FIG. 1). When the height of the protruding portion 20 is the height difference H, an opening end of the outer package case 10 and the base 6 contact each other and the protruding portion 20 of the base 6 and the opening sealing member 14 contact each other. The outer package case 10 and the protruding portion 20 function as a support portion, and the disposition of the base 6 is thereby stabilized and the capacitor main body 4 is supported by both of the circumferential portion and the central portion. The protruding portion 20 contacting the opening sealing member 14 can suppress at a high level any invasion of the resin injected between the base 6 and the opening sealing member 14 to form the resin layer 8-1, into the insertion through hole portions 18-1 and 18-2.

The height of the protruding portion 20 may be smaller than the height difference H and may be larger than the height difference H. The protruding portion 20 whose height is smaller than the height difference H can suppress any invasion of the resin for forming the resin layer 8-1 into the insertion through hole portions 18-1 and 18-2. A gap is formed between the protruding portion 20 and the opening sealing member 14, and a flow path leading to the insertion through hole portions 18-1 and 18-2 of the base 6 can be formed for air and the resin by the gap. The protruding portion 20 whose height is larger than the height difference H contacts the opening sealing member 14, and can suppress at a high level any invasion of the resin injected between the base 6 and the opening sealing member 14 into the insertion through hole portions 18-1 and 18-2. A gap is formed between the opening end of the outer package case 10 and the base 6, and a flow path for air can be formed by this gap.

As depicted in, for example, A of FIG. 2, the protruding portion 20 has an almost rectangular shape having a narrowed portion in a central portion thereof in the longitudinal direction thereof. The protruding portion 20 includes retreat portions 44 in the central portion in the longitudinal direction, and the retreat portions 44 form the narrowed portion. The protruding portion 20 includes flat portions 46 in end portions thereof in the longitudinal direction thereof. The protruding portion 20 has an outer shape that is symmetrical about, for example, the virtual line L1 depicted in A of FIG. 2, and has a shape that is symmetrical about the central line L2 depicted in A of FIG. 2. The virtual line L1 is a line that connects the insertion through hole portion 18-1 and the insertion through hole portion 18-2 to each other, and the central line L2 is a line that passes through the halfway point O of the insertion through hole portion 18-1 and the insertion through hole portion 18-2 to intersect the virtual line L1 at a right angle.

The protruding portion 20 includes groove portions 48 and 50 on the surface facing the opening sealing member 14. The groove portion 48 is formed such that the height of an intermediate portion between the insertion through hole portion 18-1 and the insertion through hole portion 18-2 is partially lowered, and extends to the side of the resin injection hole 30 and the side of the through hole 32 to form a resin path. In the groove portion 48, the flow amount of the resin flowing through the groove portion 48 can be adjusted corresponding to the width of the groove portion 48.

The groove portions 50 each extend from the flat portion 46 of the protruding portion 20 to one of the insertion through hole portions 18-1 and 18-2 to form an air flow path. The groove portions 50 can discharge the air that is pushed out by the injection of the resin, to the exterior through the groove portions 50. To form the resin layer 8-2, the groove portions 50 may also cause a portion of the injected resin to pass therethrough to thereby cause the resin to reach the insertion through hole portions 18-1 and 18-2. The width, the depth, the disposition interval, or the installation quantity of the groove portions 50 is set as necessary taking into consideration, for example, the passage of the air and suppression of any invasion of the resin. The groove portions 50 are formed, for example, only on the face on the side of the through hole 32 of the protruding portion 20. Any flow of the resin to the insertion through hole portions 18-1 and 18-2 directly through the groove portion 50 can therefore be suppressed. The resin injected from the resin injection hole 30 flows into a space on the side of the through hole 32 of the space between the opening sealing member 14 and the base 6 by the injection pressure, and the resin is thereafter pushed into the groove portions 50 by a pushing pressure of the resin that fills the space. The resin can consequently be caused to flow to the groove portions 50 with a pressure lower than the injection pressure. The amount of the resin flowing to the insertion through hole portions 18-1 and 18-2 can therefore be adjusted so that the resin flowing into the mounting face of the base 6 does not influence the connectivity of the terminal leads 16-1 and 16-2, and the wiring board to each other.

The circumferential wall 22 is the circumferential portion of the base 6 and is disposed on the outer side of the opening end of the outer package case 10 to surround the opening end of the outer package case 10. The inner side face of the circumferential wall 22 has a circular shape to be shaped along the outer circumference of the outer package case 10 having the bottomed cylinder-like shape. As depicted in FIG. 3, the circumferential wall 22 may be higher than the protruding portion 20, may be as high as the protruding portion 20, or may be lower than the protruding portion 20.

The guide grooves 24-1 and 24-2 are formed on the substrate mounting face of the base 6, and extend from the second insertion through hole portions 18-1 and 18-2 to the outer side. The terminal portions of the terminal leads 16-1 and 16-2 are folded in the opposite directions along the guide grooves 24-1 and 24-2 to be disposed in the guide grooves 24-1 and 24-2. The guide grooves 24-1 and 24-2 therefore guide the terminal portions of the terminal leads 16-1 and 16-2. Instead of the guide grooves 24-1 and 24-2, guide protrusions may be disposed on the substrate mounting face of the base 6. The stability of the capacitor 2 at the time when the capacitor 2 is mounted can be secured by the guide grooves 24-1 and 24-2 or the guide protrusions.

The support protruding portions 26-1 and 26-2 are an example of the protruding portions that support the opening end of the outer package case 10, and are partially formed at positions to be adjacent to the resin layer 8-1 and for the base 6 to contact the opening end of the outer package case 10. As depicted in A of FIG. 2, the support protruding portions 26-1 and 26-2 are formed on the main body disposing face of the base 6 and on the side of the base 6 more inner than the circumferential wall 22. The support protruding portion 26-1 has an arc shape having a width, and covers the outer side of the resin injection hole 30 and the protruding portion 20 in an arc-like shape. The support protruding portion 26-2 has a circular shape and is disposed on the outer side of the through hole 32. In the portions where the support protruding portions 26-1 and 26-2 are formed, the opening end of the outer package case 10 contacts the support protruding portions 26-1 and 26-2. In the divided portions of the support protruding portions 26-1 and 26-2, the opening end of the outer package case 10 is distant from the base 6 and a gap is formed between the opening end of the outer package case 10 and the base 6. The gap between the opening end of the outer package case 10 and the base 6 forms a resin path for the resin to flow between the circumferential wall 22 of the base 6 and the outer circumferential face of the outer package case 10.

As depicted in A of FIG. 2, the resin injection hole 30 is formed on the central line L2. The resin injection hole 30 is an example of an insertion through hole used for injection of the resin, and is formed at equal distances from the insertion through hole portions 18-1 and 18-2.

As depicted in A of FIG. 2, the through hole 32 is formed on the central line L2. The through hole 32 is formed in, for example, the terminal portion into which the resin finally flows in the resin injection, and is used to check the resin that reaches the terminal portion along the injection path for the resin. The through hole 32 is also used to discharge the air pushed out by the injection of the resin, and the checking of the filling state of the resin is made easy by the through hole 32 and the discharge of the air is made easy thereby.

The shielding portion 34 is the circumferential portion of the through hole 32 and is disposed between the through hole 32 and the resin injection hole 30. The shielding portion 34 suppresses any invasion of the resin injected from the resin injection hole 30, from the side of the resin injection hole 30 of the through hole 32 into the through hole 32. The shielding portion 34 suppresses burying of the through hole 32 by the resin before the resin fully spreads in the region where the resin layer 8-1 is to be formed. The shielding portion 34 surrounds a portion, for example, two thirds of the circumference of the through hole 32. The shielding portion 34 surrounds preferably 50% or more of the circumference of the through hole 32, and surrounds desirably 66% or more thereof. As depicted in, for example, A of FIG. 2, for example, 10% of the circumference of the through hole 32 may be open without being surrounded by the shielding portion 34.

As depicted in B of FIG. 2, the step portion 36 is formed on the substrate mounting face of the base 6 and on the periphery of the resin injection hole 30. The step portion 36 is used for, for example, the positioning of a resin injecting apparatus that is connected to the resin injection hole 30 when the resin is injected. The step portion 36 provides a space for preventing the resin in the vicinity of the resin injection hole 30 from projecting from the substrate mounting face of the base 6.

As depicted in B of FIG. 2, the step portion 38 is formed on the substrate mounting face of the base 6 and on the circumference of the through hole 32. The step portion 38 provides a space for preventing the resin in the vicinity of the through hole 32 from projecting from the substrate mounting face of the base 6.

As depicted in B of FIG. 2, the support portions 40 are formed on the substrate mounting face of the base 6 and in the vicinity of corner portions of the base 6. The support portions 40 can stabilize the attitude of the capacitor 2 by contacting at a point in the state where the capacitor 2 is mounted on the wiring board.

The resin layer 8-1 is disposed outside of the protruding portion 20, inside of the opening end of the outer package case 10, and between the base 6 and the opening sealing member 14. The resin layer 8-1 causes the capacitor main body 4 and the base 6 to closely adhere to each other, and seals, together with the base 6, the outer side face of the opening sealing member 14. The resin layer 8-2 is disposed inside the insertion through hole portions 18-1 and 18-2. The resin layer 8-2 fills the gap between the inner surfaces of the insertion through hole portions 18-1 and 18-2, and the terminal leads 16-1 and 16-2. The sealing property is thereby enhanced and the amount of the gas passing through each of the insertion through hole portions 18-1 and 18-2 is suppressed. The resin injected from the resin injection hole 30 may reach the inside of the insertion through hole portions 18-1 and 18-2 to form the resin layer 8-2, or the resin may be added from the substrate mounting face of the base 6 to form the resin layer 8-2.

The resin forming the resin layers 8-1 and 8-2 is, for example, a sealing resin that seals the outer side of the opening sealing member 14, is in a liquid state when the resin fills, and hardens after the filling. When the resin fills, the liquid-state resin fills the gap between the capacitor main body 4 and the base 6, and a part of the inside of each of the insertion through hole portions 18-1 and 18-2 and, after the filling, the resin hardens to form the resin layers 8-1 and 8-2. The resin forming the resin layers 8-1 and 8-2 has affinity with the outer package case 10 and the opening sealing member 14 and has a shielding property for gases, and it is preferred that the resin has a linear expansion coefficient close to the linear expansion coefficient of aluminum (about $23 \times 10^{-6}/°$ C.), a less shrinkage when curing, and non-hygroscopicity. The resin can be, for example, epoxy resin, alkyd resin, urethane resin, thermosetting resin, or UV curable resin. The epoxy resin may be two-component mixed epoxy resin using acid anhydride or one-component epoxy resin.

[Manufacture Steps of Capacitor]

Manufacture steps of the capacitor is an example of the method for manufacturing a capacitor of the present discloser, and the manufacture steps include a forming step for the capacitor main body 4, a forming step for the base 6, an attaching step of attaching the base 6 to the capacitor main body 4, a shaping step for the terminal leads 16-1 and 16-2, and an injection step for the resin.

At the forming step for the capacitor main body 4, the separator is first interposed between the anode foil to which the terminal lead 16-1 is connected and the cathode foil to which the terminal lead 16-2 is connected, and the anode foil, the cathode foil, and the separator are wound to form the capacitor element 12. The capacitor element 12 is impregnated with an electrolytic solution, and the capacitor element 12 is sealed in the outer package case 10. The opening sealing member 14 is thereafter attached to the opening of the outer package case 10 to form the capacitor main body 4. The outer package case 10 is formed by, for example, aluminum.

At the forming step for the base 6, the base 6 is formed into the above shape from an insulating synthetic resin. In this embodiment, the capacitor element 12 is impregnated with an electrolytic solution to form an electrolytic capacitor while the capacitor 2 is not limited to the electrolytic capacitor. The capacitor 2 may be a solid-state electrolytic capacitor that uses the capacitor element 12 impregnated with an electrically conductive polymer to form a solid-state electrolytic layer, or may be a hybrid capacitor in which the capacitor element 12 impregnated with an electrically conductive polymer is impregnated with an electrolytic solution.

At the attaching step for the base 6, the terminal leads 16-1 and 16-2 of the capacitor main body 4 are caused to penetrate the insertion through hole portions 18-1 and 18-2 of the base 6. The base 6 is moved for the base 6 to be attached to the capacitor main body 4 on the side of the opening sealing member 14. At the attaching step, the protruding portion 20 of the base 6 is disposed on the side of the opening sealing member 14.

At the shaping step for the terminal leads 16-1 and 16-2, the terminal leads 16-1 and 16-2 are folded along the guide grooves 24-1 and 24-2 of the base 6, and the terminal portions of the terminal leads 16-1 and 16-2 are disposed in the guide grooves 24-1 and 24-2. This shaping step causes the base 6 to be fixed on the capacitor main body 4.

At the injection step for the resin, the liquid-like resin injected from the resin injection hole 30 of the base 6 fills the gap between the capacitor main body 4 and the base 6. The resin spreads on the periphery of the resin injection hole 30 and flows on the side of the through hole 32 through the gap between the protruding portion 20 and the support protruding portion 26-1 or the groove portion 48 to spread on the periphery of the through hole 32 and the shielding portion 34. A portion of the resin flows to the outer side of the capacitor main body 4 through the outer side of an end of the support protruding portion 26-1. Another portion of the resin may flow to the inside of each of the insertion through hole portions 18-1 and 18-2 through the groove portion 50. The injected resin forms the resin layer 8-1 between the capacitor main body 4 and the base 6, and forms the resin layer 8-2 in the inside of each of the insertion through hole portions 18-1 and 18-2. A resin injecting apparatus such as a dispenser is used for injecting the resin, for example.

According to the first embodiment, the following actions or effects are achieved.

(1) The opening distance D1 on the side of the substrate mounting face of the insertion through hole is larger than the opening distance D2 on the side of the capacitor main body 4. On the side of the substrate mounting face, the force acting on the resin in the insertion through hole caused by the capillary action can therefore be suppressed. In the case where, for example, a thermosetting resin is used to form the resin layers 8-1 and 8-2, it can be suppressed that the thermosetting resin whose viscosity is reduced immediately before the hardening thereof is received the force in the direction toward the substrate mounting face side.

(2) The move of the resin in the insertion through hole to the outer side of the base due to the capillary action can be suppressed. The disposition of the resin on the periphery of the terminal leads that are disposed on the outer side of the base (the substrate mounting face) can therefore be suppressed, and the obstruction by the resin to the soldering of the terminal leads can be suppressed.

(3) Because the move of the resin can be suppressed, any reduction of the amount of the filling resin can be suppressed. Any reduction and any dispersion of the resin filling amount can be suppressed and the quality of the capacitor can be made uniform.

Figure 5:
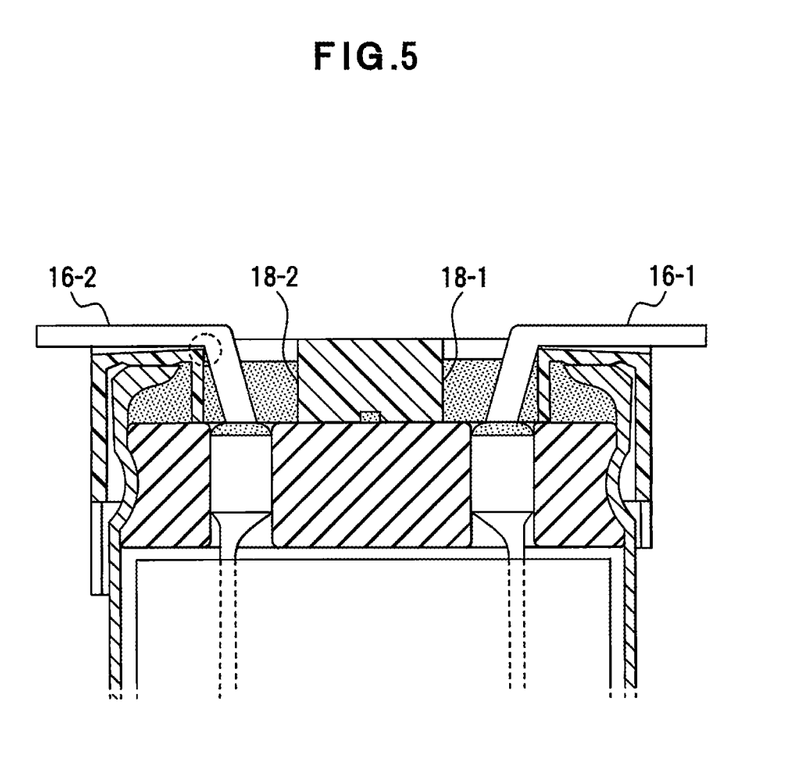
FIG. 5 is a diagram for explaining an effect of the capacitor.

(4) When the opening distance of each of the insertion through hole portions 18-1 and 18-2 is increased as a whole, as depicted in FIG. 5, the terminal portions of the terminal leads 16-1 and 16-2 may each be inclined from the foot thereof in the folding direction of the terminal portion. In this case, in a portion surrounded by a circular dotted line depicted in FIG. 5, the gaps between the terminal leads 16-1 and 16-2, and the insertion through hole portions 18-1 and 18-2 become small and the capillary action tends to occur. The step portion 42 of the insertion through hole portions 18-1 and 18-2 can suppress the inclination from the foot of each of the terminal portions, and can suppress the capillary action.

Second Embodiment

Figure 6:
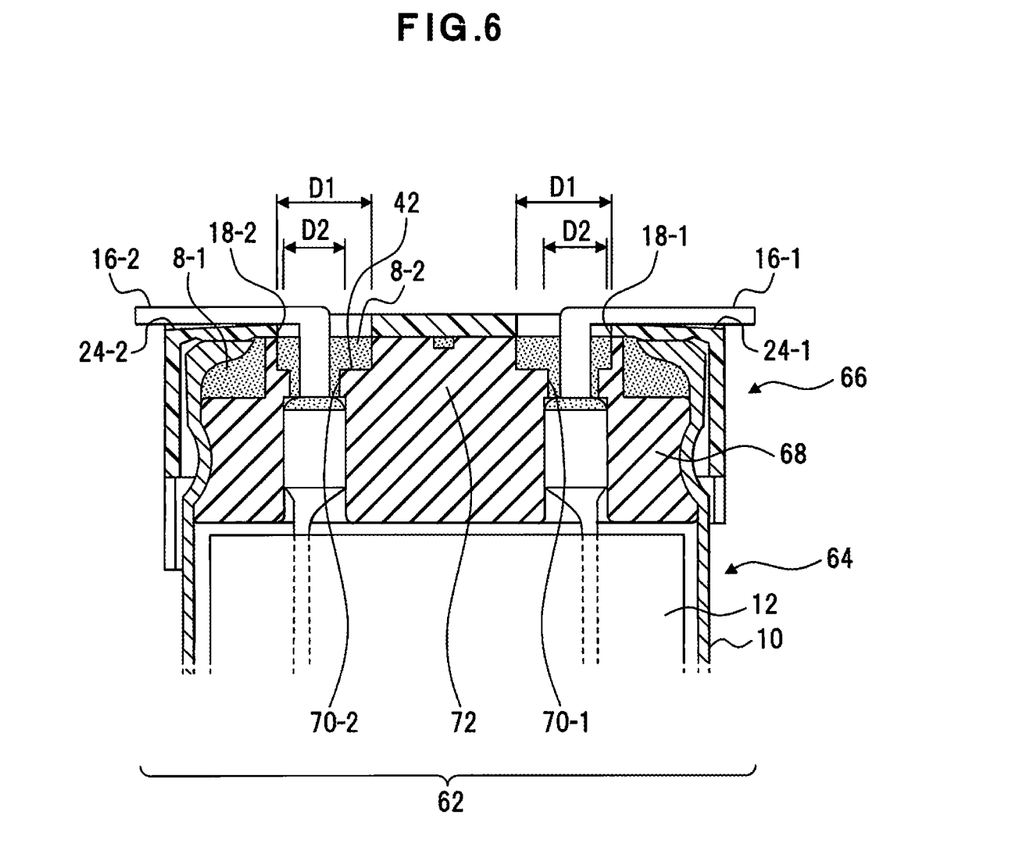
FIG. 6 is a cross-sectional diagram depicting an example of a capacitor according to a second embodiment.

FIG. 6 is a cross-sectional diagram depicting an example of a capacitor according to a second embodiment. FIG. 6 does not depict a portion of the capacitor main body. In FIG. 6, the same portion as that in FIG. 1 is denoted by the same reference sign. The configuration depicted in FIG. 6 is an example and the technique of the present disclosure is not limited to this configuration.

The capacitor 2 of the first embodiment includes the protruding portion 20 that is formed in the base 6 while a capacitor 62 of the second embodiment includes a second protruding portion 72 that is formed in an opening sealing member 68 instead of the protruding portion 20.

The capacitor 62 is an example of an electronic part and is, for example, an electrolytic capacitor or an electric double-layer capacitor. The capacitor 62 includes a capacitor main body 64, a base 66, and the resin layers 8-1 and 8-2. The base 66 is disposed on the capacitor main body 64, the resin layer 8-1 is disposed in a gap between the base 66 and the capacitor main body 64, and the resin layer 8-2 is disposed in the inside of an insertion through hole formed by the base 66 and an opening sealing member 68.

The capacitor main body 64 is same as the capacitor main body 4 described in the first embodiment except the opening sealing member 14. The capacitor main body 64 includes the opening sealing member 68 instead of the opening sealing member 14. The capacitor main body 64 will not be described except the opening sealing member 68.

The opening sealing member 68 is formed by, for example, an insulating rubber. The opening sealing member 68 includes first insertion through hole portions 70-1 and 70-2 (hereinafter, referred to as "insertion through hole portions 70-1 and 70-2"), and a second protruding portion 72 (hereinafter, referred to as "protruding portion 72").

The insertion through hole portions 70-1 and 70-2 are formed at positions corresponding to those of the terminal leads 16-1 and 16-2. The terminal leads 16-1 and 16-2 of the capacitor element 12 penetrate the insertion through hole portions 70-1 and 70-2 of the opening sealing member 68, and are exposed on the outer side of the capacitor main body 64.

The protruding portion 72 is disposed on the outer side face of the opening sealing member 68. The protruding portion 72 is formed on the periphery of the insertion through hole portions 70-1 and 70-2, and surrounds the insertion through hole portions 70-1 and 70-2. The protruding portion 72 contacts the base 66 and isolate the resin layer 8-1 adjacent to the protruding portion 72 and the insertion through hole portions 70-1 and 70-2 from each other.

The base 66 is same as the base 6 described in the first embodiment except the protruding portion 20. The base 66 does not include the protruding portion 20 described in the first embodiment. In the base 66, the insertion through hole portions 18-1 and 18-2 are therefore formed in the range of the plate thickness of the base 6.

The insertion through hole portions 70-1 and 70-2 are connected respectively to the insertion through hole portions 18-1 and 18-2 of the base 66. The insertion through hole portions 18-1 and 18-2, and portions that are of the insertion through hole portions 70-1 and 70-2 and are surrounded by the protruding portion 72 form insertion through holes for the terminal portions of the terminal leads 16-1 and 16-2. The insertion through holes formed by the insertion through hole portions 18-1 and 18-2, and the insertion through hole portions 70-1 and 70-2 can be caused to have the same shape as that of the insertion through holes formed by the insertion through hole portions 18-1 and 18-2 described in the first embodiment, and have, for example, the step portion 42 described in the first embodiment.

According to the second embodiment, the actions or the effects described in the first embodiment can be achieved.

The features, advantages, a modification example, or the like will be listed below for the above embodiments.

Figure 7:
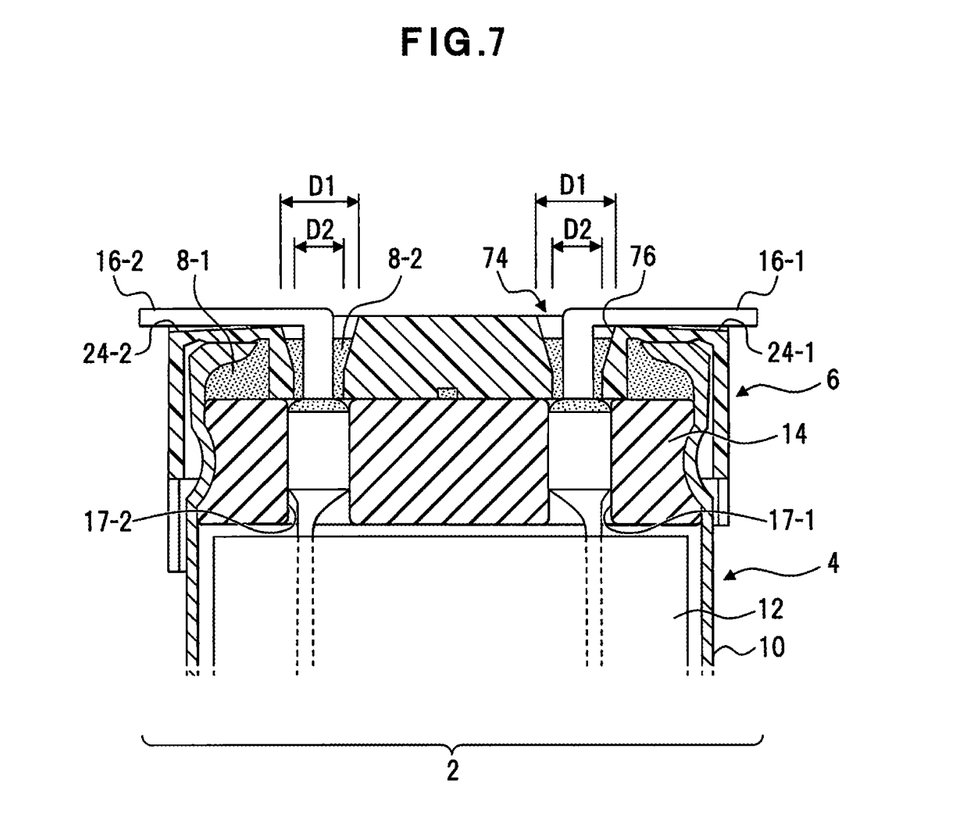
FIG. 7 is a cross-sectional diagram depicting an example of a capacitor according to a modification example.

(1) In the first embodiment, the insertion through holes formed by the insertion through hole portions 18-1 and 18-2 include the step portions 42 such that the opening distance D1 on the side of the substrate mounting face of the insertion through holes is larger than the opening distance D2 on the side of the capacitor main body 4. The shape of the insertion through hole is however not limited to the shape described in the first embodiment. As depicted in FIG. 7, for example, the insertion through holes formed by the insertion through hole portions 74 may each include a slope face 76 instead of the step portion 42 for the opening distance D1 on the side of the substrate mounting face of the insertion through hole to be set to be larger than the opening distance D2 on the side of the capacitor main body 4. Similarly, in the second embodiment, the insertion through hole may include the slope face 76 depicted in FIG. 7 instead of the step portion 42. The insertion through hole may include plural step portions that are formed like stairs.

(2) In the embodiments, the width W1 of the step portion 42-1 is set to be larger than the width W2 of the step portion 42-2. The width W1 may however be a width equal to the width W2, or the width W1 may be smaller than the width W2.

(3) In the embodiments, the distance D3 from the step portion 42 to the substrate mounting face of the base 6 is set to be larger than the distance D4 from the step portion 42 to the surface of the protruding portion 20. The distance D3 may however be a distance equal to the distance D4, or the distance D3 may be smaller than the distance D4.

(4) The materials to form the bases 6 and 66, the resin layers 8-1 and 8-2, the outer package case 10, and the opening sealing members 14 and 68 are not limited to the above materials, and may be changed as necessary. It is preferred that the bases 6 and 66 are transparent or translucent, and the resin layers 8-1 and 8-2 are colored. The bases 6 and 66 can be made transparent or translucent by using, for example, a polycarbonate (PC) resin. The filling state of the resin can be checked through the substrate mounting face of each of the bases 6 and 66 by using these bases 6 and 66, and these resin layers 8-1 and 8-2.

(5) It is only required that the protruding portion 20 surrounds the insertion through hole portions 18-1 and 18-2 and that the protruding portion 72 surrounds the insertion through hole portions 70-1 and 70-2, and the shapes thereof are not limited to the described shapes and may be changed as necessary. For example, the base 6 may include two first protruding portions, and these two first protruding portions may respectively surround the insertion through hole portions 18-1 and 18-2. The opening sealing member 68 may include two second protruding portions, and these two second protruding portions may respectively surround the insertion through hole portions 70-1 and 70-2. The groove portions 48 and 50 may be disposed when necessary.

(6) In the embodiments, the resin injection hole 30 is formed in each of the bases 6 and 66, and the resin is injected after the bases 6 and 66 are respectively disposed to the capacitor main bodies 4 and 64 to form the resin layers 8-1 and 8-2 while this may be changed as necessary. The resin may be adhered to the capacitor main bodies 4 and 64 or the bases 6 and 66, the bases 6 and 66 may thereafter be attached respectively to the capacitor main bodies 4 and 64 on the side of the opening sealing members 14 and 68, and the resin may be caused to fully spread between the capacitor main bodies 4 and 64, and the bases 6 and 66 to fill the gaps between the capacitor main bodies 4 and 64, and the bases 6 and 66 with the resin. The resin filling the gaps between the capacitor main bodies 4 and 64, and the bases 6 and 66 consequently forms the resin layer 8-1. According to this configuration, the resin injection hole 30 does not need to be disposed.

The most preferred embodiment of the present disclosure and the like have been described as above while the technique of the present disclosure is not limited to the above description, and it is obvious that those skilled in the art can make various modifications and changes thereto based on the gist of the invention described in the claims or disclosed in the description and it is needless to say that the modifications and the changes are included in the scope of the present disclosure.

INDUSTRIAL APPLICABILITY

The technique of the present disclosure can widely be used in electronic devices and is useful.

REFERENCE SIGNS LIST 2, 62 capacitor
4, 64 capacitor main body
6, 66 base
8-1, 8-2 resin layer
8-1 and 8-2 resin layer
10 outer package case
12 capacitor element
14, 68 opening sealing member
16-1, 16-2 terminal lead
17-1, 17-2, 70-1, 70-2 first insertion through hole portion
18-1, 18-2, 74 second insertion through hole portion
20 first protruding portion
22 circumferential wall
24-1, 24-2 guide groove
26-1, 26-2 support protruding portion
30 resin injection hole
32 through hole
34 shielding portion
36, 38, 42, 42-1, 42-2 step portion
40 support portion
43-1, 43-2 end portion
44 retreat portion
46 flat portion
48, 50 groove portion
72 second protruding portion
76 slope face

The invention claimed is:
1. A capacitor comprising:
a capacitor main body including an outer package case, an opening sealing member that has a first insertion through hole portion and that is attached to an opening of the outer package case, and a terminal lead led out from the first insertion through hole portion;
a base disposed on a side of the opening sealing member of the capacitor main body, the base having a second insertion through hole portion through which the terminal lead is inserted to expose the terminal lead on a side of a substrate mounting face; and resin layers including a first resin layer disposed between the base and the opening sealing member and a second resin layer, wherein the base includes a first protruding portion surrounding the second insertion through hole portion, so that the second insertion through hole portion of the base forms an insertion through hole; or the opening sealing member includes a second protruding portion that surrounds the first insertion through hole portion and that contacts the base, so that the second insertion through hole portion of the base and the first insertion through hole portion surrounded by the second protruding portion form an insertion through hole, wherein the first resin layer is adjacent to the first protruding portion or the second protruding portion, wherein the second resin layer is disposed inside the insertion through hole, and wherein an opening distance on the side of the substrate mounting face of the insertion through hole is larger than an opening distance on a side of the capacitor main body of the insertion through hole.

2. The capacitor according to claim 1, wherein the insertion through hole includes a step portion or a slope face on an inner side face of the insertion through hole.

3. The capacitor according to claim 2, wherein a difference between the opening distances on a side more outer than the terminal lead is smaller than a difference between the opening distances on a side closer to a center than the terminal lead.

4. The capacitor according to claim 1, wherein a difference between the opening distances on a side more outer than the terminal lead is smaller than a difference between the opening distances on a side closer to a center than the terminal lead.

5. The capacitor according to claim 1, wherein a part of the second resin layer is disposed inside a portion of the insertion through hole, and the portion of the insertion through hole has the opening distance on the side of the substrate mounting face of the insertion through hole.

6. A method for manufacturing a capacitor comprising:

fabricating a capacitor main body including an outer package case, an opening sealing member that has a first insertion through hole portion and that is attached to an opening of the outer package case, and a terminal lead led out from the first insertion through hole portion;

fabricating a base having a second insertion through hole portion;

disposing the base on a side of the opening sealing member of the capacitor main body and inserting the terminal lead through the second insertion through hole portion to expose the terminal lead on a side of a substrate mounting face;

forming resin layers including a first resin layer and a second resin layer, wherein at the fabricating of the base, a first protruding portion surrounding the second insertion through hole portion is formed in the base, so that the second insertion through hole portion of the base forms an insertion through hole; or at the fabricating of the capacitor main body, a second protruding portion that surrounds the first insertion through hole portion and that has a height to contact the base is formed in the opening sealing member, so that the second insertion through hole portion of the base and the first insertion through hole portion surrounded by the second protruding portion form an insertion through hole, wherein the first resin layer is disposed between the base and the opening sealing member, and the second resin layer is disposed inside the insertion through hole, and wherein an opening distance on the side of the substrate mounting face of the insertion through hole is larger than an opening distance on a side of the capacitor main body of the insertion through hole.

7. The method for manufacturing a capacitor according to claim 6, wherein the first resin layer is adjacent to the first protruding portion or the second protruding portion.

8. The method for manufacturing a capacitor according to claim 6, wherein a part of the second resin layer is disposed inside a portion of the insertion through hole, and the portion of the insertion through hole has the opening distance on the side of the substrate mounting face of the insertion through hole.

* * * * *